US011252383B2

(12) United States Patent
Chen et al.

(10) Patent No.: US 11,252,383 B2
(45) Date of Patent: Feb. 15, 2022

(54) SYSTEM, APPARATUS AND METHOD FOR DISPLAYING IMAGE DATA

(71) Applicants: Huawei Technologies Co., Ltd., Shenzhen (CN); CAMBRIDGE ENTERPRISE LIMITED, Cambridgeshire (GB)

(72) Inventors: Jhensi Chen, Cambridgeshire (GB); Jia Jia, Cambridgeshire (GB); Daping Chu, Cambridgeshire (GB); Qing Zhang, Shenzhen (CN); Tao Lin, Shenzhen (CN)

(73) Assignees: Huawei Technologies Co., Ltd., Shenzhen (CN); Cambridge Enterprise Limited, Cambridgeshire (GB)

( * ) Notice: Subject to any disclaimer, the term of this patent is extended or adjusted under 35 U.S.C. 154(b) by 69 days.

(21) Appl. No.: 16/659,255

(22) Filed: Oct. 21, 2019

(65) Prior Publication Data
US 2020/0053327 A1 Feb. 13, 2020

Related U.S. Application Data

(63) Continuation of application No. PCT/EP2017/059426, filed on Apr. 20, 2017.

(51) Int. Cl.
*H04N 9/31* (2006.01)
(52) U.S. Cl.
CPC ........... *H04N 9/312* (2013.01); *H04N 9/3155* (2013.01)
(58) Field of Classification Search
CPC .... G03B 21/008; G03B 21/28; G03B 21/208; G03B 21/2013; G03B 21/2033;
(Continued)

(56) References Cited

U.S. PATENT DOCUMENTS 6,008,929 A 12/1999 Akimoto et al.
6,906,852 B1 * 6/2005 Russell .............. G02B 27/1033
345/32
(Continued)

FOREIGN PATENT DOCUMENTS

CN 1211024 A 3/1999
CN 101495948 A 7/2009
(Continued)

OTHER PUBLICATIONS

Doherty et al., "Pulse width modulation control in DLP™ projectors," DLP-Device-To-Product Transition: Defining Customer Satisfaction Deliverables, pp. 115-121, TI Technical Journal (Jul.-Sep. 1998).

*Primary Examiner* — Sultan Chowdhury
(74) *Attorney, Agent, or Firm* — Leydig, Voit & Mayer, Ltd.

(57) ABSTRACT

The present invention provides a display system for displaying image data. The display system comprises a light source; a spatial light modulator including a plurality of controllable reflective elements; a light source controller, configured to control the light source to emit, in each of a plurality of time intervals, light with a different illumination power level, wherein the time intervals have the same length; and a spatial light modulator controller, configured to activate, based on received image data, the plurality of controllable elements for at least one of the time intervals for directing the light from the light source for display the image data. Accordingly, the frame rate and bandwidth of the display system are increased significantly so as to be suitable for the light filed applications.

14 Claims, 9 Drawing Sheets

(58) Field of Classification Search
CPC .... G03B 21/2053; H04N 9/312; H04N 9/315; H04N 9/3123; H04N 9/3126; H04N 9/3132; H04N 9/3135; H04N 9/3152; H04N 9/3155; G09G 3/346; G09G 3/2025
See application file for complete search history.

(56) References Cited

U.S. PATENT DOCUMENTS

| | | |
|---|---|---|
| 2002/0140910 A1 | 10/2002 | Stark et al. |
| 2004/0141742 A1* | 7/2004 | So ................... G02B 26/0841 398/45 |
| 2007/0120786 A1* | 5/2007 | Bellls, II ................ G09G 3/346 345/84 |
| 2007/0296663 A1 | 12/2007 | Goetz et al. |
| 2008/0158654 A1* | 7/2008 | Rekieta ................... G02F 1/31 359/316 |
| 2009/0009850 A1 | 1/2009 | Shirai et al. |
| 2009/0147033 A1* | 6/2009 | Arai ................... G02B 26/0833 345/697 |
| 2009/0147154 A1* | 6/2009 | Arai ..................... H04N 9/3123 348/750 |
| 2009/0273825 A1* | 11/2009 | Ichikawa ........... G02B 27/1033 359/292 |
| 2016/0073072 A1* | 3/2016 | Tanaka ................ H04N 9/3155 353/31 |

FOREIGN PATENT DOCUMENTS

| | | |
|---|---|---|
| EP | 0889458 A2 | 1/1999 |
| EP | 0905674 A1 | 3/1999 |
| WO | 2007143171 A2 | 12/2007 |

* cited by examiner

SYSTEM, APPARATUS AND METHOD FOR DISPLAYING IMAGE DATA

CROSS-REFERENCE TO RELATED APPLICATIONS

The application is a continuation of International Application No. PCT/EP2017/059426, filed on Apr. 20, 2017, the disclosure of which is hereby incorporated by reference in its entirety.

TECHNICAL FIELD

The present application relates to a display system, in particular a projection display system, for displaying image data. The present application further relates to a system controller for a display system for displaying image data, and to a method for displaying image data.

BACKGROUND

With the development of light field display technology, less display latency and higher bandwidth of display are desired for a projection display system as compared with before. In particular, for Augmented Reality/Virtual Reality (AR/VR) applications, high frame rate of the projection display system is desired to reduce the display latency. In addition, light field displays should be capable of displaying a number of depth (focal) layers, in particular 6 or more depth (focal) layers, in order to allow a comfortable user experience. In order to meet the desired attributes, the device could have a bandwidth capable of supporting the desired frame rate taking into account the number of depth layers and image resolution. As an example, in systems with a frame rate of 90 fps (frames per second), with a resolution of 1920×1080, 6 depth layers and a color depth of 8 bits, the required bandwidth would be $2.7 \times 10^{10}$ bits/s or 27 G bits/s (90 fps×1920×1080 (resolution)×6 (depth layers)×3 (RGB)×8 (colour depth)).

Typically, conventional projection display systems use light reflected or transmitted by individual elements of a spatial light modulator (SLM) to generate a display image. One type of spatial light modulator is a digital micro-mirror device (DMD). Conventional DMD devices realize grey levels by reflecting light with constant predefined power from a light source for different time durations. As an example, in the case of a 4 bits color depth (=$2^4$ grey levels), the illumination power corresponding to the least significant bit will be obtained or accumulated by reflecting light for 1×Δt seconds, while the illumination power corresponding to the most significant bit will be obtained or accumulated by reflecting light for 8×Δt seconds, where Δt is a predefined time interval.

However, conventional projection display systems (as described above) only support 60 fps or less and have a bandwidth of the order of $10^9$ bits/s (for 6 depth layers and a color depth of 8 bits). Therefore, it is difficult for such projection display systems to meet the requirements of new applications, such as 3D projection of AR/VR applications. Accordingly, there is a challenge for improving the design of projection display systems for the light field applications, such as AR/VR applications.

SUMMARY

In view of the above-mentioned problems and disadvantages, embodiments of the present invention improve the frame rate and the bandwidth of conventional projection display systems. Exemplary embodiments of the present invention provide a projection display system, and a method for displaying image data, which supports a high frame rate and high bandwidth for light field applications. Exemplary embodiments of the present invention also provide a system controller for a display system for displaying image data, such that the system controller can be operated for the light field application complying with high frame rate and high bandwidth requirements.

A first aspect of the present application provides a display system for displaying image data, in particular, an N-bit-color-depth image, where the display system includes:
 a light source;
 a spatial light modulator including a plurality of controllable reflective elements;
 a light source controller, configured to control the light source to emit, in each of a plurality of time intervals, light with a different illumination power level, where the time intervals have the same length (duration);
 a spatial light modulator controller, configured to activate, based on received image data, the plurality of controllable elements for at least one of the time intervals for directing the light from the light source for display the image data.

In particular, N illumination power levels corresponds to N color depth bits; the time interval indicates the shortest time duration for controlling the spatial light modulator. In particular, the time interval indicates the shortest time duration for the controllable reflective elements after which the controllable reflective elements may change their state. In other words, the time interval indicates the shortest time duration for the controllable reflective elements maintaining the on or off states. In particular, the plurality of controllable reflective elements may be activated for each time interval for directing the light with an illumination power level corresponding to each color depth bit from the light sources for display of the N-bit-color-depth image.

By modulating the illumination power of the light source, the spatial light modulator can reflect light with an illumination power level corresponding to each color depth bit in a single time interval. Thus, for an N-bits color-depth image as an example, an exemplary embodiment of the present invention consumes N time intervals to realize $2^N$ grey levels while the conventional method consumes ($2^N-1$) time intervals. Accordingly, the improvement of the frame rate is ($2^N-1$)/N and the frame rate and bandwidth of the display system can be increased significantly so as to be suitable for light filed applications.

In a first implementation form of the display system according to the first aspect, the light source controller is configured to control of the light source by performing pulse count modulation of the light source, where each illumination power level corresponds to a predefined number of pulse sectors.

This represents an efficient way for modulating the illumination power of the light source such that the spatial light modulator can reflect light with an illumination power level corresponding to each color depth bit in a single time interval. In particular, the illumination powers corresponding to N color depth bits can be obtained or accumulated by reflecting light with N illumination power levels in the respective N time intervals, where the N time intervals have equal duration.

In a second implementation form of the display system according to the first implementation form of the first aspect, each time interval is further subdivided into the predefined number of pulse sectors and the illumination power level in each time interval is obtained by activating at least one pulse, in at least one corresponding pulse sector among the predefined number of pulse sectors.

This represents a flexible way for modulating the illumination power of the light source such that the spatial light modulator can reflect light with an illumination power level corresponding to each color depth bit in a single time interval. In particular, the illumination powers corresponding to N color depth bits are obtained or accumulated by reflecting light with N illumination power levels in the respective N time intervals, where the N time intervals have equal duration. In particular, the higher color-depth-bit level, more pulses are activated, and the more light illumination power in this bit.

In a third implementation form of the display system according to the first or second implementation form of the first aspect, the predefined number of pulse sectors is $2^{(N-1)}$, where N indicates the color-depth of the image data.

In a fourth implementation form of the display system according to the first aspect, the light source controller is configured to control of the light source by performing amplitude modulation of the light source, where each illumination power level corresponds to a different amplitude level of the light emitted by the light source.

This represents an efficient way for modulating the illumination power of the light source such that the spatial light modulator can reflect light with an illumination power level corresponding to each color depth bit in a single time interval.

In a fifth implementation form of the display system according to the fourth implementation form of the first aspect, a number of illumination power levels is N, the illumination power level in an n-th time interval has a light amplitude of $\sqrt{C*2^n}$, where $n \in [0, 1, 2, \ldots, N-1]$, C is a constant; and N indicates the color-depth of the image data.

This represents a flexible way for modulating the illumination power of the light source such that the spatial light modulator can reflect light with an illumination power level corresponding to each color depth bit in a single time interval. In particular, the illumination power of the light source may be changed by modulating a voltage supply according to the respective level of light amplitude.

In a sixth implementation form of the display system according to the first aspect or any implementation form of the first aspect, the number of time intervals corresponds to the number N of color-depth bits and the length of each time interval corresponds to the same number of clock cycles of the display system, in particular, one clock cycle of the display system.

Thus, it is allowed to support different applications of the light filed display, in particular, support different color depth images at a range of frame rates of the display system. For example, it may be allowed to support the bandwidth of display being 90 fps×(1920×1080) (resolution)×6 layers×3 (RGB)×8 (colour depth)=$2.7 \times 10^{10}$ bits/s=27 G bits/s.

In a seventh implementation form according to the first aspect or any implementation form of the first aspect, the plurality of controllable reflective elements includes a digital micro-mirror device (DMD) mirror array.

A second aspect of the present application provides a system controller for a display system for displaying image data, in particular, an N-bit-color-depth image, having a spatial light modulator and a light source, the system controller having:

a light source controller configured to control the light source to emit, in each of a plurality of time intervals, light with a different illumination power level, where the time intervals have the same length; in particular, N illumination power levels are corresponding to N color depth bits; and a spatial light modulator controller, configured to activate, based on received image data, a plurality of controllable elements for at least one of the time intervals (ΔTf) for directing the light from the light source for display of the image data, where the plurality of controllable reflective elements are included in the spatial light modulator. In particular, the plurality of controllable reflective elements may be activated for each time interval for directing the light with an illumination power level corresponding to each color depth bit from the light sources for display of the N-bit-color-depth image.

In a first implementation form of the second aspect, the light source controller is configured to control of the light source by performing pulse count modulation of the light source, where each illumination power level corresponds to a predefined number of pulse sectors.

In a second implementation form according to the first implementation form of the second aspect, each time interval is further subdivided into the predefined number of pulse sectors and the illumination power level in each time interval is obtained by activating at least one pulse, in at least one corresponding pulse sector among the predefined number of pulse sectors.

In a third implementation form of the second aspect, the light source controller is configured to control of the light source by performing amplitude modulation of the light source, where each illumination power level corresponds to a different amplitude level of the light emitted by the light source.

In a fourth implementation form according to the third implementation form of the second aspect, a number of illumination power levels is N, the illumination power level in an n-th time interval has a light amplitude of $\sqrt{C*2^n}$, where $n \in [0, 1, 2, \ldots, N-1]$, C is a constant; and N indicates the color-depth of the image data.

In a fifth implementation form according to the second aspect or any implementation form of the second aspect, the plurality of controllable reflective elements includes a digital micro-mirror device (DMD) mirror array.

A third aspect of the present application provides a display system including a system controller according to the second aspect or any implementation form of the second aspect.

A fourth aspect of the present application provides a method for displaying image data, the method including: receiving the image data, controlling a light source to emit, in each of a plurality of time intervals, light with a different illumination power level, where the time intervals have the same length, and activating, based on the image data, a plurality of controllable reflective elements for at least one of the time intervals for directing the light from the light source for display of the image data.

In a first implementation form of the fourth aspect as such, the step of controlling the light source includes: controlling of the light source by performing pulse count modulation of the light source, where each illumination power level corresponds to a predefined number of pulse sectors.

In a second implementation form according to the first implementation form of the fourth aspect, each time interval is further subdivided into the predefined number of pulse sectors and the illumination power level in each time interval is obtained by activating at least one pulse, in at least one corresponding pulse sector among the predefined number of pulse sectors. The predefined number of pulse sectors is $2^{(N-1)}$, where N indicates the color-depth of the image data.

In a third implementation form of the fourth aspect as such, the step of controlling the light source includes: controlling of the light source by performing amplitude modulation of the light source, where each illumination power level corresponds to a different amplitude level of the light emitted by the light source.

In a fourth implementation form according to the third implementation form of the fourth aspect, a number of illumination power levels is N, the illumination power level in an n-th time interval has a light amplitude of $\sqrt{C*2^n}$, where n∈[0, 1, 2, . . . , N−1], C is a constant and N indicates the color-depth of the image data.

In a fifth implementation form according to any implementation form of the fourth aspect or the fourth aspect, the number of time intervals corresponds to the number N of color-depth bits and the length of each time interval corresponds to the same number of clock cycles of the display system, in particular, one clock cycle of the display system.

The method of the second aspect and its implementation forms achieve all advantages described above for the device of the first aspect and its respective implementation forms.

All devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms of the present application will be explained in the following description of exemplary embodiments in relation to the enclosed drawings, in which.

DETAILED DESCRIPTION OF EMBODIMENTS

Figure 1:
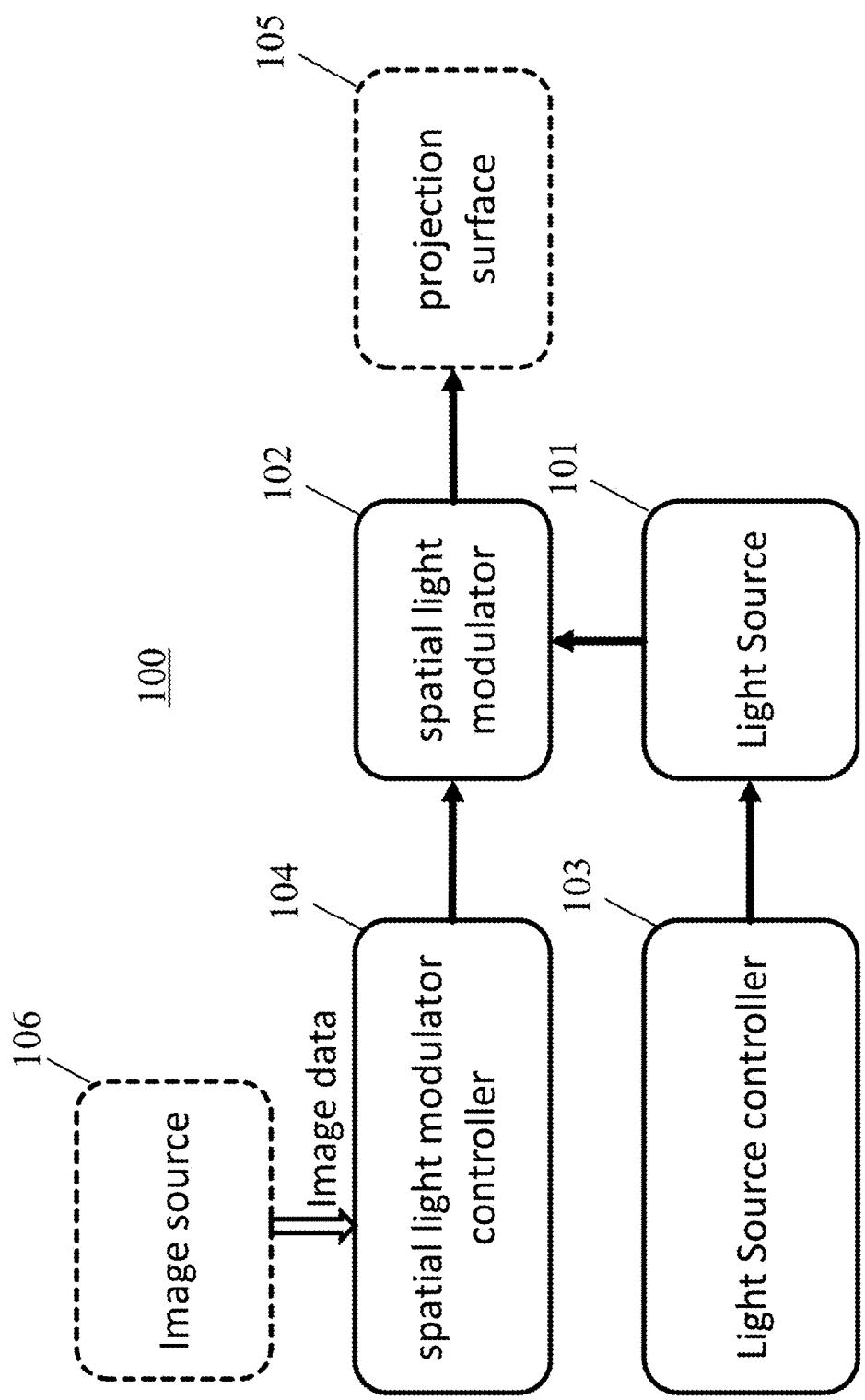
FIG. 1 shows a projection display system according to an exemplary embodiment of the present invention.

FIG. 1 shows a display system 100 according to an exemplary embodiment of the present invention, which is suitable for light field applications, such as AR/VR applications. The display system 100 includes a light source 101, a spatial light modulator 102, a light source controller 103 and a spatial light modulator controller 104.

Further, the display system 100 also may include a projection surface 105, such as a screen, or a display. In some application the display system may project the image directly to the eyes of a user. In this case the projection surface may be the human eyes.

The display system 100 may also include an image source 106. The image source 106 can include any of a number of devices which transmit image (video) signals, including a computer, a set-top box for cable or satellite television or many other sources.

The light source 101 and the spatial light modulator 102 are configured to be controlled by the light source controller 103 and the spatial light modulator controller 104 respectively, as will be discussed in greater detail below. It can be understood that the light source controller 103 may issue light control signals to the light source 101 for controlling the intensity or illumination power of the light source 101. The spatial light modulator controller 104 also may issue modulation control signals to the spatial light modulator 102 in order to control the status of the reflective elements in different time intervals or in each of a plurality of time intervals. As an example, the reflective elements may be controlled by the modulation control signals to reflect light for display. Examples of how the light source and the reflective elements are controlled will be given below.

The light source 101 may include one or more light sources, for example, the light source 101 may include a first light source, a second light source, and a third light source. In some implementations, each of the light sources may emit a respective one of three primary colors. In one example, the first light source includes an LED array for emitting blue light, the second light source includes an LED array for emitting green light, and the third light source includes an LED array for emitting red light. However, other colors and arrangements of colors can be used.

The spatial light modulator 102 is configured to receive light from the light source 101, and may include a plurality of controllable reflective elements. Each of the controllable reflective elements is configured to either let the incoming light from the light source 101 arrive to the projection surface 105 for projection or not. Each of the controllable reflective elements, which can be in two different states, represents one or more pixels in the projected image. The number of controllable reflective elements is associated to the resolution of the projected image. By controlling the state of the controllable reflective elements, the amount of light arriving at the projection surface can be controlled. For instance, the state of the controllable reflective elements can be set depending on image data written to an associated memory cell. The light reflected from the controllable reflective elements may be focused on the projection surface, for instance by means of a focusing element, such as a focusing lens.

Specifically, the spatial light modulator 102 may be a reflective spatial light modulator. In an example, the spatial light modulator 102 may be a DMD 102 which includes an array 102a of mirror elements. In another example, the spatial light modulator 102 may be an LCoS (liquid crystal on silicon) 102 which uses liquid crystals instead of individual mirrors. In LCoS, liquid crystals are applied to a reflective mirror substrate. As different voltages are applied to the liquid crystals according to the modulation control signal issued by the spatial light modulator controller 104, the liquid crystals can open and close, and the liquid crystals allows light to be reflected to the focusing element or blocked.

Figure 2:
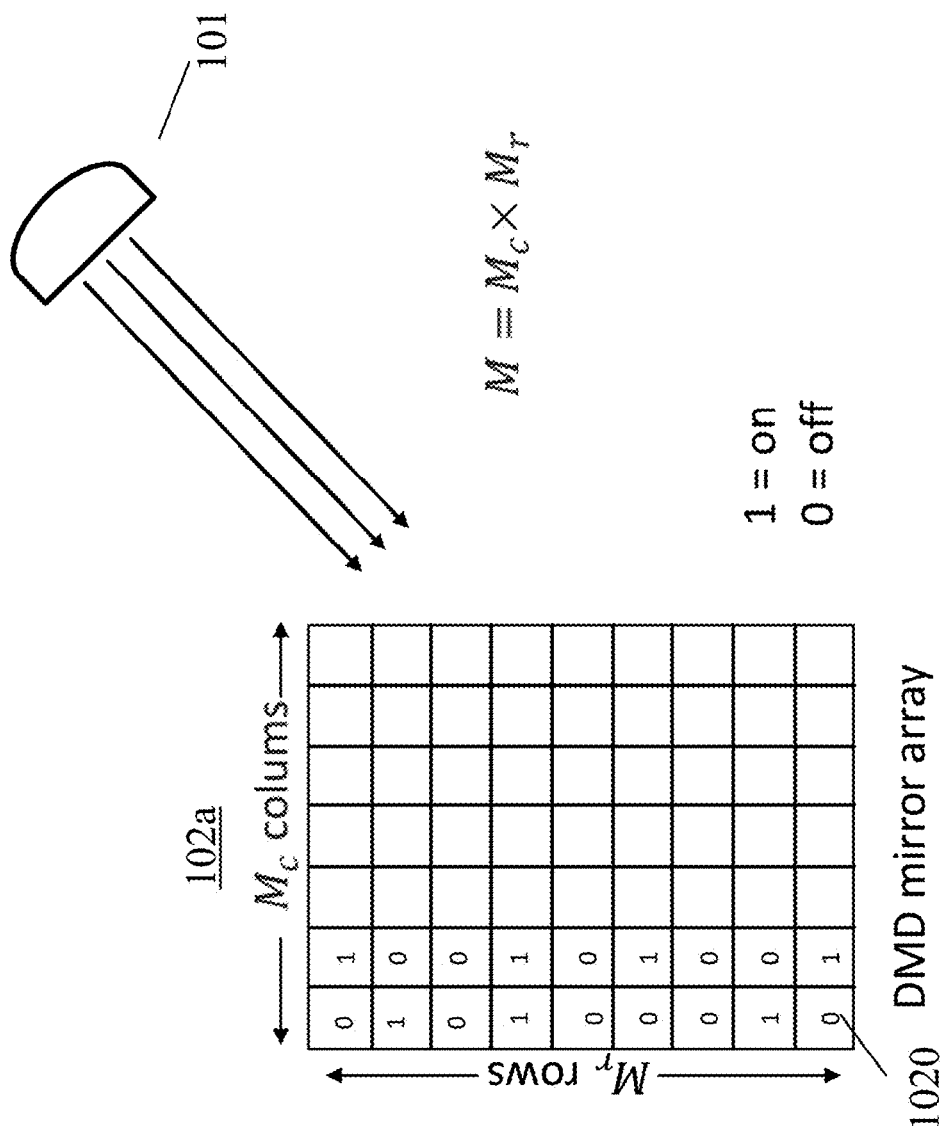
FIG. 2 shows a portion of a DMD mirror array having mirror elements.

FIG. 2 shows a portion of a DMD mirror array 102a having mirror elements 1020. Each of its mirror elements can be in one of two different mirror pixel states, namely either in an ON state (for instance 1=ON) or in an OFF state (for instance 0=OFF). The DMD 102 is configured such that only mirror elements in their ON state reflect the illumination light towards the focusing element (not illustrated in FIG. 1) of the display system. Thus, the portion of the illumination light reflected by the mirror elements in their ON state passes through the focusing element (not illustrated in FIG. 1) to form a display image on the projection surface 105.

The mirror element 1020 may be a micro-mirror which can be tilted to be in the ON or OFF state according to the modulation control signal issued by the spatial light modulator controller 104. As an example a tilt of the micro-mirror by a first angle (for instance+12°) with respect to a DMD normal axis may represent an ON state, while a tilt of the micro-mirror by a second angle (for instance−12°) with respect to the DMD normal axis may represent an OFF state. The DMD normal axis is an axis normal to a surface area of the DMD mirror array on which the micro-mirror is mounted. The state of the mirror element 1020 may be changed in accordance with image data written to an associated memory cell. Each of the mirror elements 1020 may represent one or more pixels. In particular, the illumination light reflected from mirror elements (surfaces) which are tilted to be in an ON state is projected through the focusing element to the projection surface 105 for displaying an image. In other words, the DMD 102 may represent an array of individual pixels, where the array dimensions determines the resolution of the particular DMD. For example, the array 102a may consist of Mr rows and Mc columns (M=Mr×Mc mirror elements), corresponding to a resolution of M=Mr× Mc image pixels. More details will be explained in the following, with reference to FIGS. 4 and 7.

For the sake of simplicity, the following description refers to a DMD mirror array. However, it is clear that this description applies to any implementation of a spatial light modulator including controllable reflective elements, such as an LCoS. In this case the DMD frame or spatial light modulator (SLM) frame has to be interpreted as a time interval after which the controllable reflective elements may change their status. In other words, the DMD frame is the time interval during which the controllable reflective elements keep their status.

The light source controller 103 is configured to control the light source 101 to emit, in each of a plurality of time intervals, light with a different illumination power level, where the time intervals have the same length. In some embodiments, the number of time intervals corresponds to the number N of color-depth bits and the length of each time interval corresponds to the same (minimal) number of clock cycles of the projection display system 100, in particular, one clock cycle of the display system 100. For example, the time intervals may be 0.25 ms. N illumination power levels are corresponding to N color depth bits.

The spatial light modulator controller 104 is configured to receive image data from the image source 106 and activate, based on the image data, the plurality of controllable reflective elements 1020 for at least one of the time intervals for directing the light from the light source 101 for display of the image data, for instance for generating the desired color depth for each image pixel.

In particular, if the image data is an N bits color-depth image, a plurality of controllable reflective elements may be activated for each time interval for directing light with an illumination power corresponding to each color depth bit from the light sources for display of the N-bits color-depth image. The light reflected by the controllable reflective elements may be directed to the projection surface 105 through the focusing element. It can be understood that in the present application, each time interval is used for obtaining or accumulating the illumination power corresponding to each color depth bit. The time interval indicates the shortest time duration of the spatial light modulator, such as the DMD. The shortest time duration may be for instance 1 unit time duration or 1 frame of the spatial light modulator or in an implementation 1 DMD frame. In particular, the time interval indicates the shortest time duration for the controllable reflective elements after which the controllable reflective elements may change their state. In other words, the time interval indicates the shortest time duration for the controllable reflective elements (DMD mirrors) maintaining the on or off states. In some examples, N DMD frames are used to compose a $2^N$ grey-level pixel, where all N DMD frames have same time duration, and N indicates the color-depth of the image data. For example, 8 time intervals or DMD frames can compose any grey-levels from 0 to 255 for a total of 256 (=$2^8$) gray levels.

As can be seen from above, by modulating the illumination power of the light source (i.e. a different illumination power level illuminated in each DMD frame), the spatial light modulator (DMD) can reflect light with an illumination power level corresponding to each color depth bit in a single DMD frame. Thus the spatial light modulator only uses N DMD frames (in general N time intervals) to realize $2^N$ grey levels while the conventional method consumes ($2^N$−1) DMD frames (explained later with reference to FIG. 5). Accordingly, the improvement of the frame rate is ($2^N$−1)/N in the exemplary embodiment of the present invention and the frame rate and the bandwidth of the display system are increased significantly, thus the display system of the present application is suitable for light filed applications.

The illumination power level may be modulated into one of a predefined number of power levels in each time interval. For example, the predefined number of power levels is N, where N indicates the color-depth of the image data. Accordingly, N illumination power levels are corresponding to N color depth bits.

Figure 3:
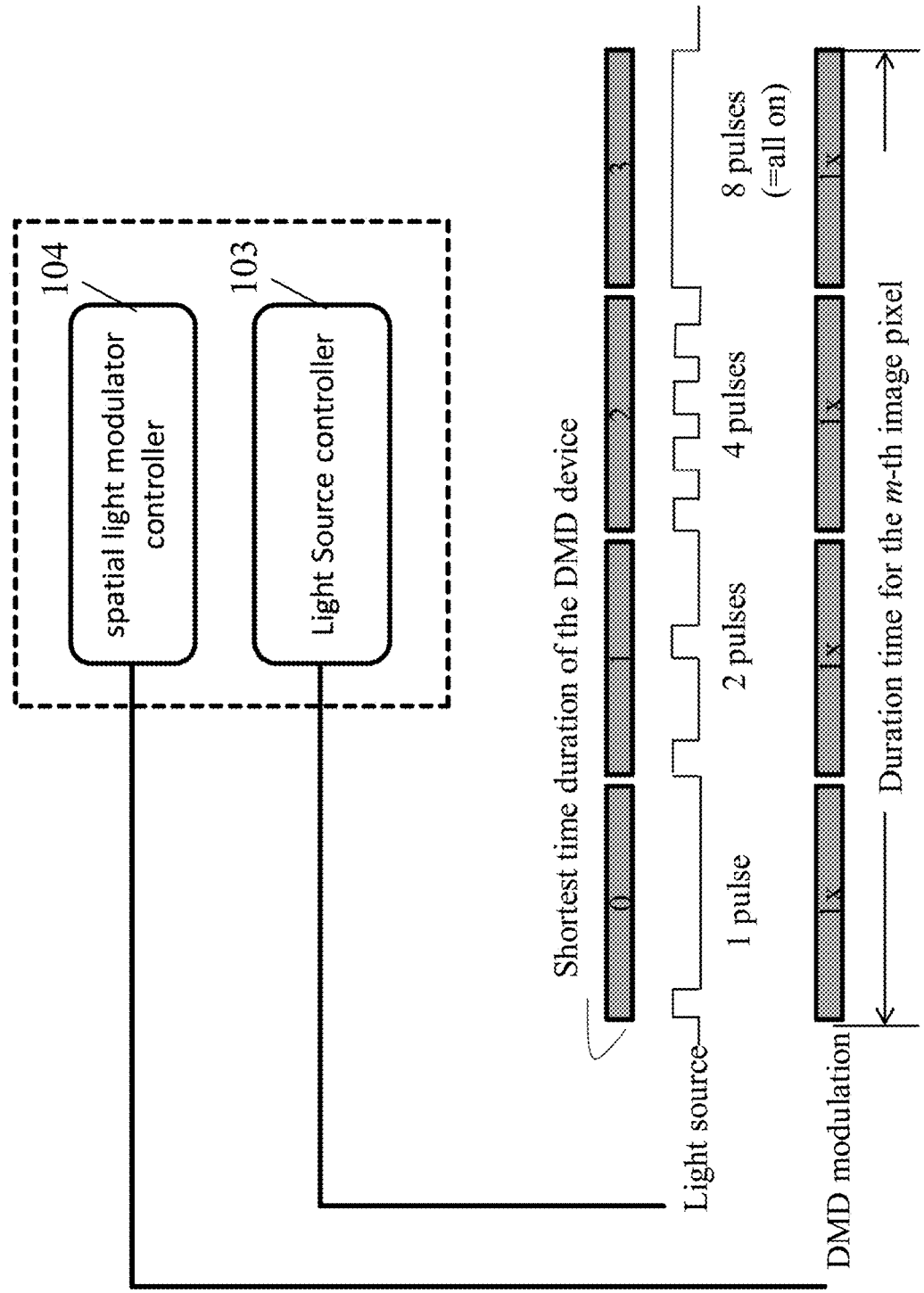
FIG. 3 shows a first exemplary embodiment describing how light source and DMD modulation in the projection display system of FIG. 1 is performed.

FIG. 3 shows a first exemplary embodiment describing how light source and DMD modulation in the projection display system of FIG. 1 is performed. The light source controller 103 is configured to control of the light source 101 by performing pulse count modulation of the light source 101. In this realization, each illumination power level in each time interval corresponds to a predefined number of pulse sectors. Specifically, each time interval (namely, DMD frame in the following description) is further subdivided into a predefined number of pulse sectors and the illumination power level in each DMD frame is obtained by activating at least one pulse, in at least one corresponding pulse sector among the predefined number of pulse sectors. Here, the pulse sector, can be understood a fraction of the time interval (DMD frame) or in short sub-time interval. In other words, different illumination power levels of the emitted light correspond to a different quantity of pulses activated in the respective DMD frames. Furthermore, in the embodiment, the modulation frequency of the light source 101 is equal to or larger than the modulation frequency of the spatial light modulator 102.

In the case of an N bits color-depth, each time interval is subdivided into $2^{(N-1)}$ pulse sectors. The number of pulses activated increases with the illumination power level required in the respective time interval and increases with the level of the color-depth-bit n. The number of pulses activated in each time interval may increase in a sequence from the first time interval (frame 0) to the last time interval (frame N−1). In such case, in the n-th time interval, there will be $2^n$ activated pulses, with n∈[0, 1, 2, . . . , N−1]. The higher the color-depth-bit level, the more pulses are activated, and the more light power in this color-depth-bit. Alternatively, the number of pulses activated in each time interval may decrease from the first time interval to the last time interval. In general the number of pulses in each time interval may be given in any predetermined sequence. In this case the illumination powers corresponding to N color depth bits may be obtained by activating the corresponding reflecting element based on the image data and the predetermined sequence.

FIG. 3 illustrates an example of a 4-bits color depth. Each DMD frame is subdivided into $2^{(4-1)}=8$ pulse sectors. Only 1 pulse is activated for the 0th DMD frame, 2 pulses are activated for the 1st DMD frame, 4 pulses for the 2nd DMD frame and 8 pulses for the 3rd DMD frame.

Figure 4:
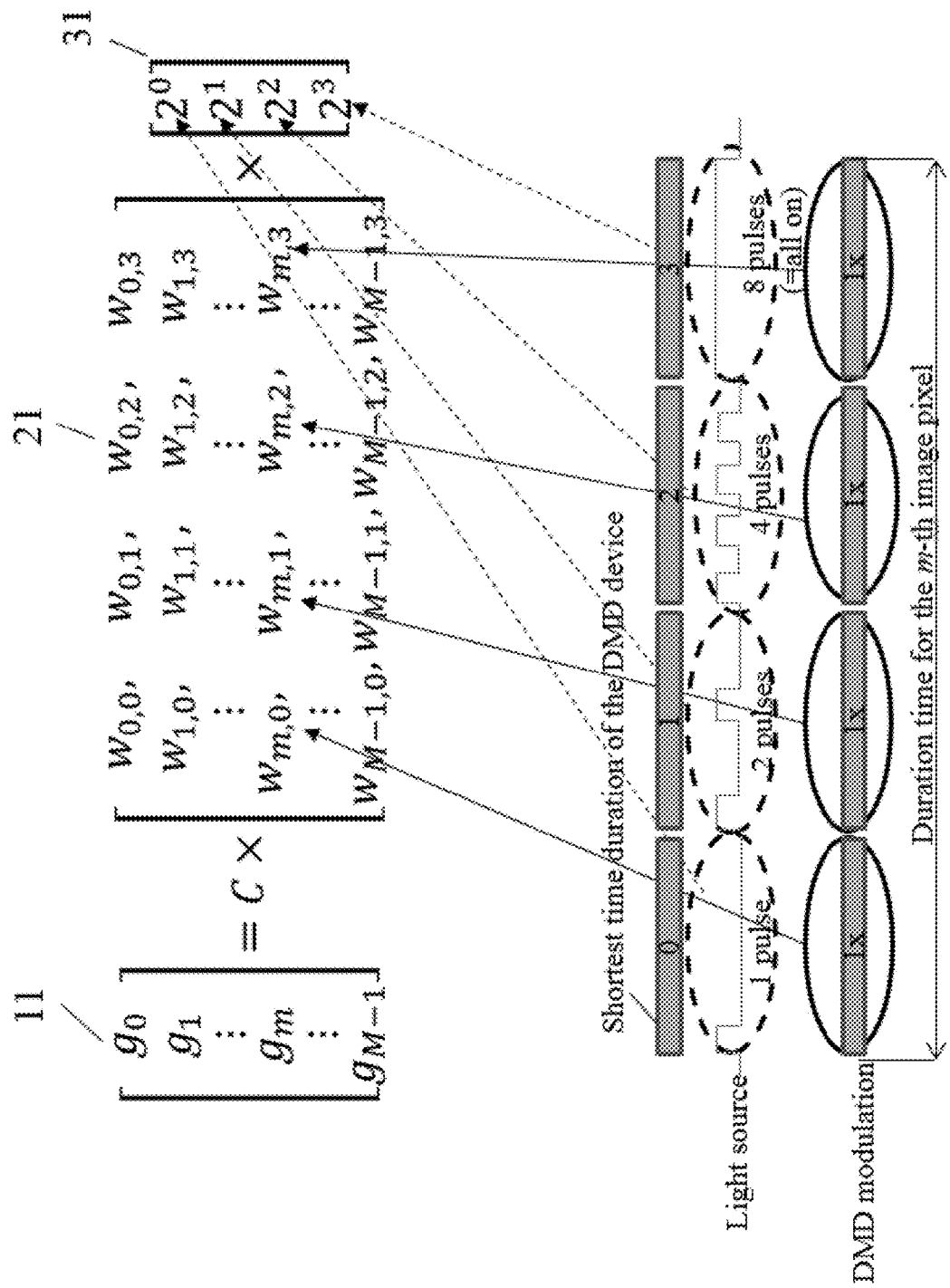
FIG. 4 shows how a 4 bits color depth image is decomposed into a DMD pattern sequence and an illumination power level sequence in the case of an array of M controllable reflective elements illustrated in FIG. 2 according to the first embodiment of the present invention of FIG. 3.

FIG. 4 shows how a 4 bits color depth image can be decomposed into a DMD pattern sequence and an illumination power level sequence in the case of an array of M controllable reflective elements as illustrated in FIG. 2 according to the first exemplary embodiment of the present invention of FIG. 3. The light source 101 may be controlled by the light source controller 103 on basis of the illumination power level sequence. The spatial light modulator 102 may be controlled by the spatial light modulator controller 104 on basis of the DMD pattern sequence. In particular, the matrix 11 may represent M pixels of an image for displaying, where the color depth of the image is N=4. The matrix 21 may represent the DMD pattern sequence, i.e. the states of the M controllable reflective elements illustrated in FIG. 2 in each of N time intervals, in which the element $W_{m,n}$ represents the state of the m-th reflective element (m-th mirror element) representing the m-th image pixel (in short m-th reflective element state) in the n-th time interval, where m∈[0, 1, 2, . . . , M−1], n∈[0, 1, 2, . . . , N−1]. The matrix 31 may represent the illumination power level sequence, i.e. the modulated light power with different illumination power levels in the different time intervals, where the n-th element represents the illumination power level in the n-th time interval.

Specifically, in the matrix 21, the element at the row 0 and the column 0 represents the state $W_{0,0}$ of the 0-th reflective element which is maintained in its ON/OFF state (respectively value $W_{0,0}=1$ or $W_{0,0}=0$) for the 0-th time interval in order to generate the 0th color-depth bit of the $0^{th}$ image pixel $g_0$ (i.e. in order to accumulate the illumination power corresponding to the 0th color-depth bit of the $0^{th}$ image pixel $g_0$); the element at the 0-th row and the 1-st column represents the state $W_{0,1}$ of the 0-th reflective element which is maintained in its ON/OFF state for the 1-st time interval in order to generate the 1st color-depth bit of the $0^{th}$ image pixel $g_0$; the element at the 0-th row and the 2-th column represents the state $W_{0,2}$ of the 0-th reflective element, which is maintained in its ON/OFF state for the 2-th time interval in order to generate the 2nd color-depth bit of the $0^{th}$ image pixel $g_0$. Finally, the element at the row 0 and the 3-th column represents the state $W_{0,3}$ of the 0-th reflective element, which is maintained in its ON/OFF state for the 3-rd time interval in order to generate the 3rd color-depth bit of the $0^{th}$ image pixel $g_0$.

In the following formula (1), N indicates the color-depth, and $W_{m,n}\in\{0, 1\}$ indicates the code value of the n th bit, m∈[0, 1, 2, . . . , M−1] and n∈[0, 1, 2, . . . , N−1].

$$\text{grey}_m = \sum_{n=0}^{N-1} W_{m,n} 2^n, \; W_{m,n} \in \{0, 1\} \qquad (1)$$

Figure 5:
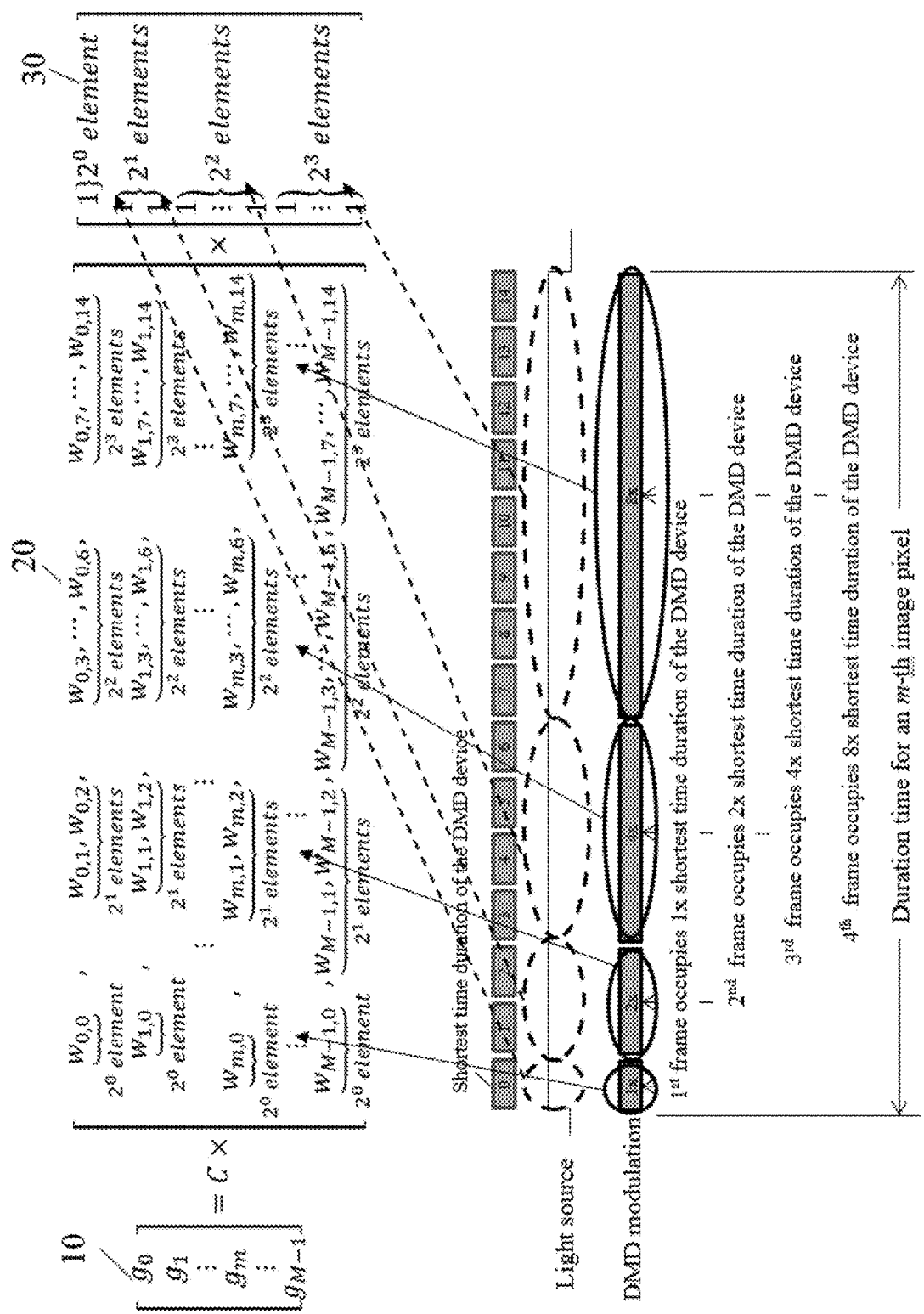
FIG. 5 shows how a 4 bits color depth image is decomposed into a DMD pattern sequence and a constant predefined power level sequence in the case of an array of M controllable reflective elements illustrated in FIG. 2 according to a conventional projection display system.

FIG. 5 shows how a 4 bits color depth image is decomposed into a DMD pattern sequence and a constant predefined power level sequence in the case of an array of M controllable reflective elements according to a conventional projection display system. The conventional modulation relies on different time durations to realize grey-levels. In particular, the matrix 10 may represent M pixels of an image for displaying, where the color depth of the image pixels is N=4. The matrix 20 may represent the DMD pattern sequence, i.e. the states of the M controllable reflective elements in each of $(2^N-1)$ time intervals, in which the m-th row represents the state of the m-th reflective element representing the m-th image pixel (in short the m-th reflective element state) and the n-th column represents the n-th time interval, where m∈[0, 1, 2, . . . , M−1], n∈[0, 1, 2, . . . , $2^N$−2]. The matrix 30 may represent the constant predefined power level sequence, i.e. constant light power (illustrated by all ones) at all $(2^N-1)$ time intervals.

For instance, in the matrix 20, the elements at the row 0 from the column 7 to column 14 represent the state of the 0-th reflective element which is kept unchanged in its ON/OFF state for 8 time intervals. In matrix 20, 4 groups can be identified, where elements in each group represent the same state of the reflective element, e.g. the 4th group (group #3) includes elements $W_{0,7}$ to $W_{0,14}$, where $W_{0,7}=W_{0,8}=W_{0,9}=W_{0,10}=W_{0,11}=W_{0,12}=W_{0,13}=W_{0,14}$. These elements span 8 time intervals (from the 7-th time interval to the $14^{th}$ time interval) in order to generate the $3^{rd}$ color-depth bit of the $0^{th}$ image pixel $g_0$ (i.e. in order to accumulate the illumination power corresponding to the 3rd color-depth bit of the $0^{th}$ image pixel $g_0$).

Figure 6:
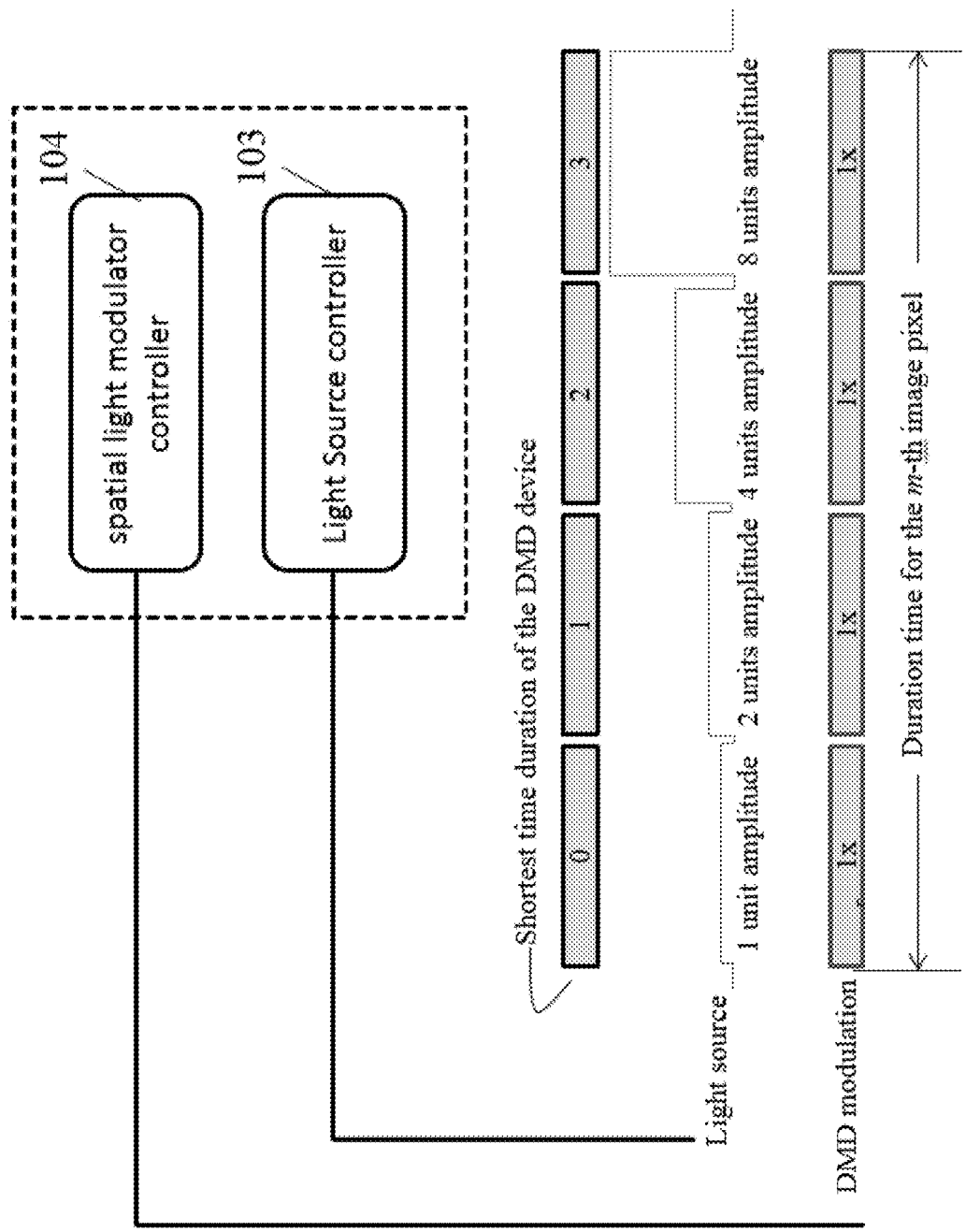
FIG. 6 shows a second exemplary embodiment describing how light source and DMD modulation in the projection display system of FIG. 1 is performed.

FIG. 6 shows a second exemplary embodiment describing how light source and DMD modulation in the projection display system of FIG. 1 is performed. The light source controller 103 is configured to control of the light source 101 by performing amplitude modulation of the light source 101, where each illumination power level corresponds to a different amplitude level of the light emitted from the light source 101. Specifically, a number of illumination power levels may be obtained by modulating the light amplitude of the light source 101, in particular, by varying the voltage supply according to the respective level of light amplitude. In this implementation, light amplitudes corresponding to different time intervals have different values.

In the case of an N bits color-depth, the number of illumination power levels is N and the illumination power level in an n-th time interval has a light amplitude of $\sqrt{C*2^n}$, where n∈[0, 1, 2, . . . , N−1], C is a constant. In other words, different illumination power levels of the emitted light correspond to different amplitude levels of the emitted light in the respective time intervals. N illumination power levels are corresponding to N color depth bits.

FIG. 6 shows an example of a color depth of 4 bits. The emitted light will have in this case 4 different illumination power levels. If the 4 different power levels are indicated as amplitude units, in the 0th time interval the illumination power level will correspond to 1 amplitude unit, in the 1st time interval the illumination power level will correspond to 2 amplitude units, in the 2nd time interval the illumination power level will correspond to 4 amplitude units, and in the 3rd time interval the illumination power level will correspond to 8 amplitude units.

Figure 7:
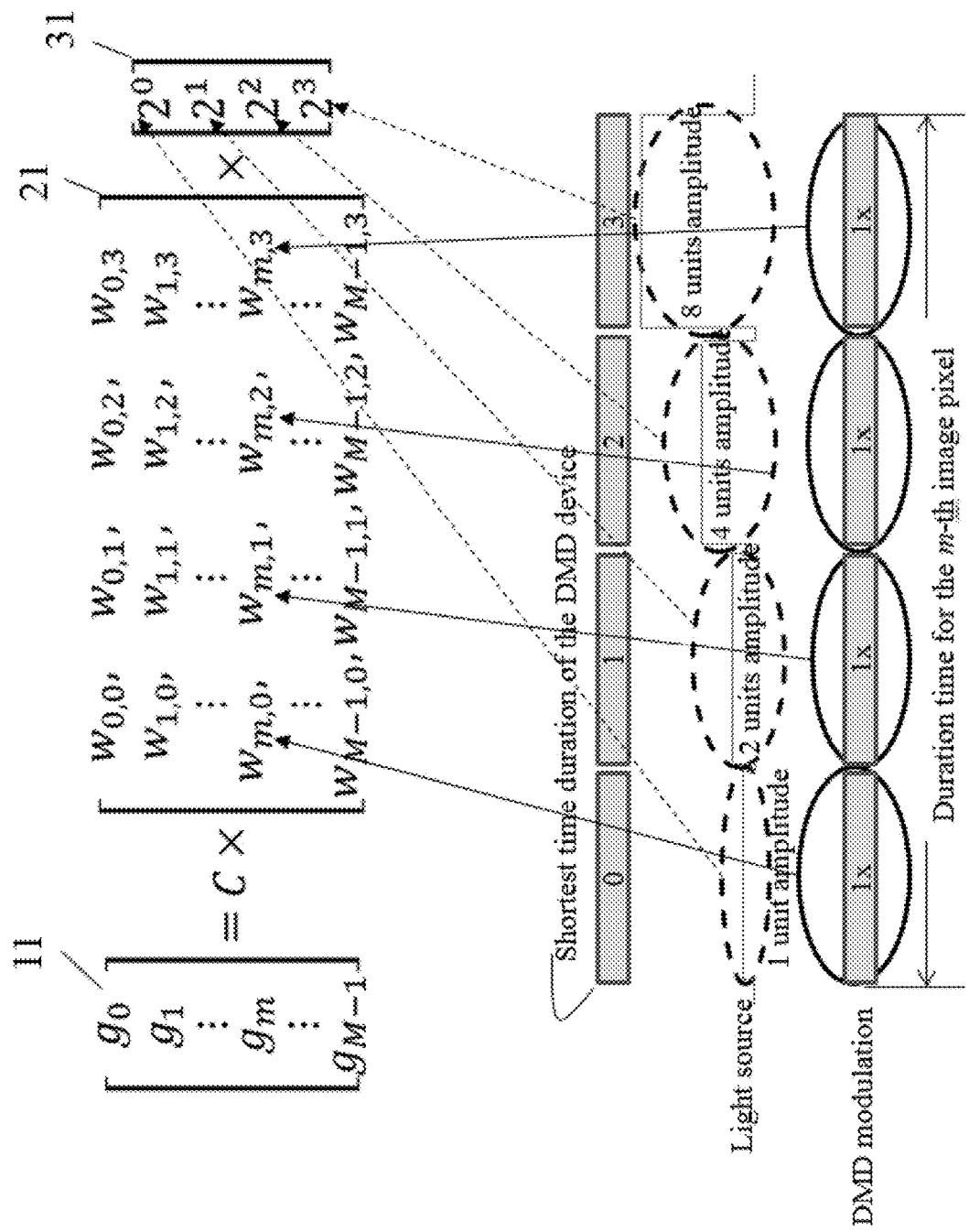
FIG. 7 shows how a 4 bits color depth image is decomposed into a DMD pattern sequence and an illumination power level sequence in the case of an array of M controllable reflective elements illustrated in FIG. 2 according to the second embodiment of the present invention of FIG. 6.

FIG. 7 shows how a 4 bits color depth image can be decomposed into a DMD pattern sequence and an illumination power level sequence in the case of an array of M controllable reflective elements as illustrated in FIG. 2 according to the second exemplary embodiment of the present invention of FIG. 6. The light source 101 may be controlled by the light source controller 103 on basis of the illumination power level sequence. The spatial light modulator 102 may be controlled by the spatial light modulator controller 104 on basis of the DMD pattern sequence. In particular, the matrix 11 may represent M pixels of an image for displaying, where the color depth of the image is N=4. The matrix 21 may represent the DMD pattern sequence, i.e. the states of the M controllable reflective elements as illustrated in FIG. 2 in each of N time intervals, in which the element $W_{m,n}$ represents the state of the m-th reflective element representing the m-th image pixel (in short m-th reflective element state) in the n-th time interval. The matrix 31 may represent the illumination power level sequence, i.e. the modulated light power with different amplitude levels in the different time intervals, where the n-th element represents the amplitude level in the n-th time interval, where m∈[0, 1, 2, . . . , M−1] and n∈[0, 1, 2, . . . , N−1].

Specifically, in the matrix 21, the element at the 0-th row and the 3-th column represents the state $W_{0,3}$ of the $0^{th}$ reflective element which is kept unchanged (in its ON/OFF state) for the 3-th time interval in order to generate the $3^{rd}$ color-depth bit of the $0^{th}$ image pixel $g_0$ (i.e. in order to accumulate the illumination power corresponding to the 3rd color-depth bit of the $0^{th}$ image pixel $g_0$).

As can be seen from FIG. 5, 4-bits color-depth is modulated within $2^4-1=15$ time intervals, with the n-th color-depth bit being modulated using $2^n$ time intervals, where n∈[0, 1, 2, . . . , N−1] (N=4). In contrast thereto, in the present application as shown in FIGS. 3, 4, 6 and 7, a color-depth of 4-bits can be modulated in only 4 time intervals. In other words, modulation with the spatial light modulator or DMD modulation of embodiments of the present invention can be performed in a single time interval for each color-depth bit. Accordingly, embodiments of the present invention improve the N-bits color-depth frame rate $(2^N-1)/N$ times, which is 3.75 considering a 4-bit color depth, or which is 31.875 considering a 8-bit color depth.

Figure 8:
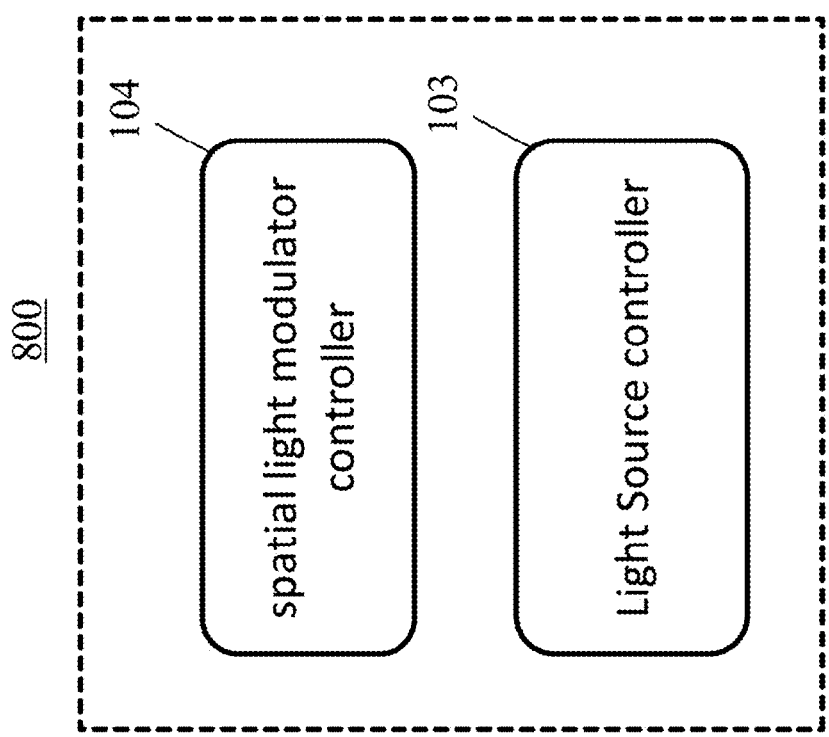
FIG. 8 shows a block diagram of an exemplary embodiment of a system controller for the display system shown in FIG. 1.

FIG. 8 shows a block diagram of the system controller 800. The system controller 800 includes the light source controller 103 described above and the spatial light modulator controller 104 described above. In a further embodiment, the light source controller 103 is further configured to start up (activate) of the light source selected from the plurality of the light sources.

Figure 9:
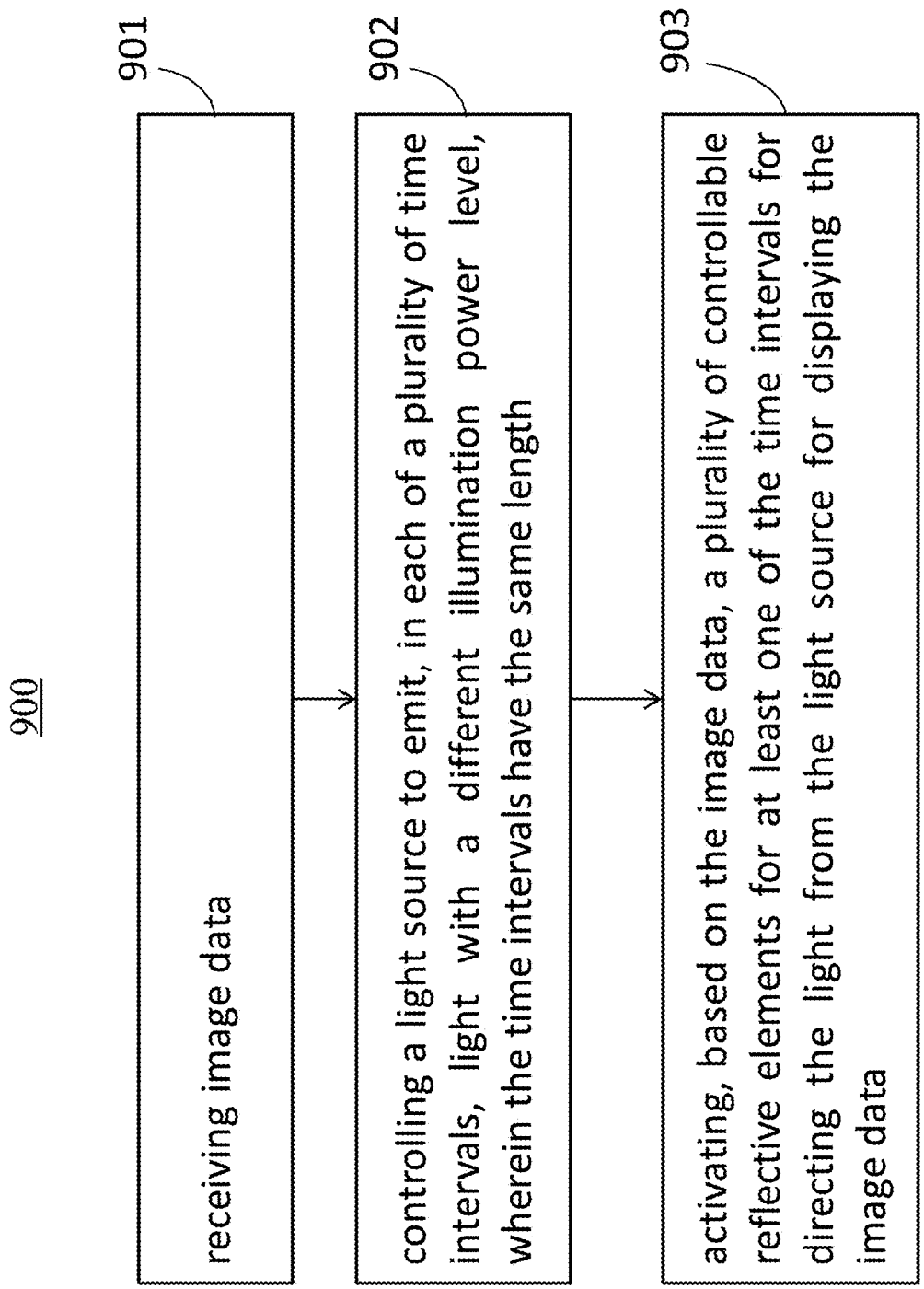
FIG. 9 shows a flowchart of a process for displaying image data according to an exemplary embodiment of the present invention.

FIG. 9 shows a method for displaying image data according to an exemplary embodiment of the present invention. Preferably, the method 900 is implemented by device 800 shown in one of the FIGS. 3, 4 and 8. The method 900 may include:

Step 901, receiving the image data; in particular, the image data may be received from the image source 106;

Step 902, controlling a light source to emit, in each of a plurality of time intervals, light with a different illumination power level, where the time intervals have the same length; and Step 903, activating, based on the image data, a plurality of controllable reflective elements for at least one of the time intervals for directing the light from the light source for display the image data.

Optionally, the method 900 further includes the step of controlling the light source selected from a plurality of light sources to selectively emit light.

In summary, in contrast to the conventional method in which only the spatial light modulator is modulated while the illumination power is constant, a method of exemplary embodiments of the present invention is to modulate not only the spatial light modulator 102 but also the illumination power of the light source 101 at the same time. Accordingly, contrary to the result of the conventional methods and devices in which $(2^N-1)$ time intervals are required to produce an N bits color depth image with the n-th bit being modulated by using $2^n$ time intervals, where n∈[0, 1, 2, . . . , N−1], the method of exemplary embodiments of the present invention gives rise to the technical effect that only N time intervals are required to produce the N bits color depth of the image (i.e. a single time interval is required for each bit of the color-depth). Thus, the method of exemplary embodiments of the present invention improves the N-bits color-depth frame rate $(2^N-1)/N$ times.

Furthermore, in exemplary embodiments of the present invention, there are at least two ways of modulating the illumination power of the light source 101: pulse count modulation and amplitude modulation.

Refer to FIG. 3, step 902 may include the steps of controlling of the light source 101 by performing pulse count modulation of the light source 101, where each illumination power level corresponds to a predefined number of pulse sectors; where each DMD frame (time interval) is further subdivided into the predefined number of pulse sectors and the illumination power level in each time interval is obtained by activating at least one pulse, in at least one corresponding pulse sector among the predefined number of pulse sectors.

Refer to FIG. 4, step 902 may include the steps of controlling of the light source 101 by performing amplitude modulation of the light source 101, where each illumination power level corresponds to a different amplitude level of the light emitted by the light source 101.

In any of the described implementation (refer for instance to FIGS. 2, 4 and 7) a plurality of controllable reflective elements are activated for each time interval for directing the light with an illumination power corresponding to each color depth bit from the light sources for display of an N-bits color-depth image. It can be understood that in the present application, the time interval indicates the shortest time duration (namely, 1 unit time duration or 1 DMD/SLM frame) of the spatial light modulator (for instance the DMD). In particular, the time interval indicates the shortest time duration for the controllable reflective elements after which the controllable reflective elements may change their state. In other words, the time interval indicates, the shortest time duration for the controllable reflective elements maintaining the on or off states.

It can be understood that, the method of this embodiment may be specifically implemented according to the above embodiments; reference may be made to the relevant description of other embodiments, which is not repeated herein.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A display system for displaying image data, wherein the display system comprises:
a light source;
a spatial light modulator comprising a plurality of controllable reflective elements;
a light source controller configured to control the light source to emit, in each of a plurality of time intervals, light with a different illumination power level, wherein the time intervals have the same length; and
a spatial light modulator controller configured to activate, based on the image data, the plurality of controllable reflective elements for at least one of the time intervals for directing the light from the light source for displaying the image data,
wherein the light source controller is configured to control the light source by performing pulse count modulation of the light source, wherein each one of a plurality of illumination power levels, which comprise the illumination power level for each of the time intervals, corresponds to a predefined number of pulse sectors, and
wherein the predefined number of pulse sectors is $2^{(N-1)}$, wherein N indicates a color-depth of the image data.

2. The display system according to claim 1, wherein:
each of the time intervals is subdivided into the corresponding predefined number of pulse sectors, and
the illumination power level in each of the time intervals is obtained by activating at least one pulse, in at least one corresponding pulse sector among the predefined number of pulse sectors.

3. The display system according to claim 1,
wherein the light source controller is configured to control the light source by performing amplitude modulation of the light source, and
wherein each one of the illumination power levels corresponds to a different amplitude level of the light emitted by the light source.

4. The display system according to claim 3, wherein:
a number of the illumination power levels is N, and
a corresponding one of the illumination power levels in an n-th time interval has a light amplitude of $\sqrt{C*2^n}$, wherein $n \in [0, 1, 2, \ldots, N-1]$ and C is a constant.

5. The display system according to claim 1, wherein the number of time intervals corresponds to the number N of color-depth bits and the length of each time interval corresponds to the same number of clock cycles of the display system.

6. A system controller for a display system for displaying image data, the display system comprising a spatial light modulator and a light source, the system controller comprising:
a light source controller configured to control the light source to emit, in each of a plurality of time intervals, light with a different illumination power level, wherein the time intervals have the same length; and
a spatial light modulator controller configured to activate, based on the image data, a plurality of controllable reflective elements for at least one of the time intervals for directing the light from the light source for displaying the image data, wherein the plurality of controllable reflective elements are comprised in the spatial light modulator,
wherein the light source controller is configured to control of the light source by performing pulse count modulation of the light source,
wherein each one of a plurality of illumination power levels, which comprise the illumination power level for each of the time intervals, corresponds to a predefined number of pulse sectors, and
wherein the predefined number of pulse sectors is $2^{(N-1)}$, wherein N indicates a color-depth of the image data.

7. The system controller according to claim 6, wherein:
each of the time intervals is subdivided into the corresponding predefined number of pulse sectors, and
the illumination power level in each of the time intervals is obtained by activating at least one pulse, in at least one corresponding pulse sector among the predefined number of pulse sectors.

8. The system controller according to claim 6,
wherein the light source controller is configured to control the light source by performing amplitude modulation of the light source, and
wherein each of the illumination power levels corresponds to a different amplitude level of the light emitted by the light source.

9. A method for displaying image data, the method comprising:
receiving the image data;
controlling a light source to emit, in each of a plurality of time intervals, light with a different illumination power level, wherein the time intervals have the same length; and
activating, based on the image data, a plurality of controllable reflective elements for at least one of the time intervals for directing the light from the light source for displaying the image data, wherein the step of controlling the light source comprises:
controlling the light source by performing pulse count modulation of the light source, wherein each of a plurality of illumination power levels, which comprise the illumination power level for each of the time intervals, corresponds to a predefined number of pulse sectors, and
wherein the predefined number of pulse sectors is $2^{(N-1)}$, wherein N indicates a color-depth of the image data.

10. The method according to claim 9, wherein each of the time intervals is subdivided into the predefined number of pulse sectors, and the illumination power level in each of the time intervals is obtained by activating at least one pulse, in at least one corresponding pulse sector among the predefined number of pulse sectors.

11. The method according to claim 9, wherein the step of controlling the light source comprises:
controlling the light source by performing amplitude modulation of the light source, wherein each of the illumination power levels corresponds to a different amplitude level of the light emitted by the light source.

12. The method according to claim 11, wherein:
a number of the illumination power levels is N, and
the illumination power level in an n-th time interval has a light amplitude of $\sqrt{C*2^n}$, wherein n∈[0, 1, 2, . . . , N−1] and C is a constant.

13. The display system according to claim 9, wherein the number of time intervals corresponds to the number N of color-depth bits and the length of each time interval corresponds to the same number of clock cycles of the display system.

14. A non-transitory computer-readable medium comprising program code stored therein, which when executed by a processor, causes the processor to perform operations comprising:
receiving image data;
controlling a light source to emit, in each of a plurality of time intervals, light with a different illumination power level, wherein the time intervals have the same length; and
activating, based on the image data, a plurality of controllable reflective elements for at least one of the time intervals for directing the light from the light source for displaying the image data,
wherein the step of controlling the light source comprises:
controlling the light source by performing pulse count modulation of the light source, wherein each of a plurality of illumination power levels, which comprise the illumination power level for each of the time intervals, corresponds to a predefined number of pulse sectors, and
wherein the predefined number of pulse sectors is $2^{(N-1)}$, wherein N indicates a color-depth of the image data.

* * * * *